United States Patent [19]

Kennelley et al.

[11] 4,378,244

[45] Mar. 29, 1983

[54] SYSTEM FOR COAL INJECTION IN IRON OXIDE REDUCING KILNS

[75] Inventors: James A. Kennelley, Larchmont; Geoffrey N. Boulter, New York, both of N.Y.; Alan C. Baker, Harriman, Tenn.; Thomas W. Goodell, Harriman, Tenn.; Daniel H. Wilbert, Knoxville, Tenn.

[73] Assignee: The Direct Reduction Corporation, New York, N.Y.

[21] Appl. No.: 317,939

[22] Filed: Nov. 3, 1981

[51] Int. Cl.³ .............................................. C21B 13/08
[52] U.S. Cl. ...................................... 75/90 R; 75/36; 266/82; 266/173
[58] Field of Search ..................... 75/33–38, 75/90 R; 266/82, 173

[56] References Cited

U.S. PATENT DOCUMENTS

| | | | |
|---|---|---|---|
| 2,484,911 | 10/1949 | Seil | 75/36 |
| 3,505,060 | 4/1970 | Heitmann | 75/1 |
| 4,304,597 | 12/1981 | Keran et al. | 75/36 |

*Primary Examiner*—Melvyn J. Andrews

*Attorney, Agent, or Firm*—Cooper, Dunham, Clark, Griffin & Moran

[57] ABSTRACT

A method and means for improved control of the process for directly reducing materials containing iron oxides in a rotary kiln using a solid carbonaceous reducing agent, such as coal, introduced from the charge feed and discharge ends of the kiln, as the source of both fuel and reductant, and oxygen-containing gas introduced along the kiln length, is disclosed wherein the portion of the reducing agent fed at the discharge end is injected in the form of two or more streams through the discharge end of the kiln onto the charge bed in such manner as to permit close and efficient control of the process, particularly when carried out in larger kilns. The important features in creating and distributing the streams over the bed are described including their longitudinal distribution and axial spread, as well as their contact regions with the kiln interior side walls and the quadrants of the kiln barrel into which they are directed, to meet the incremental heat demands along the successive segments of the charge bed, whereby the bed and gas phase temperatures may be controlled and heat transfer to the bed enhanced.

16 Claims, 4 Drawing Figures

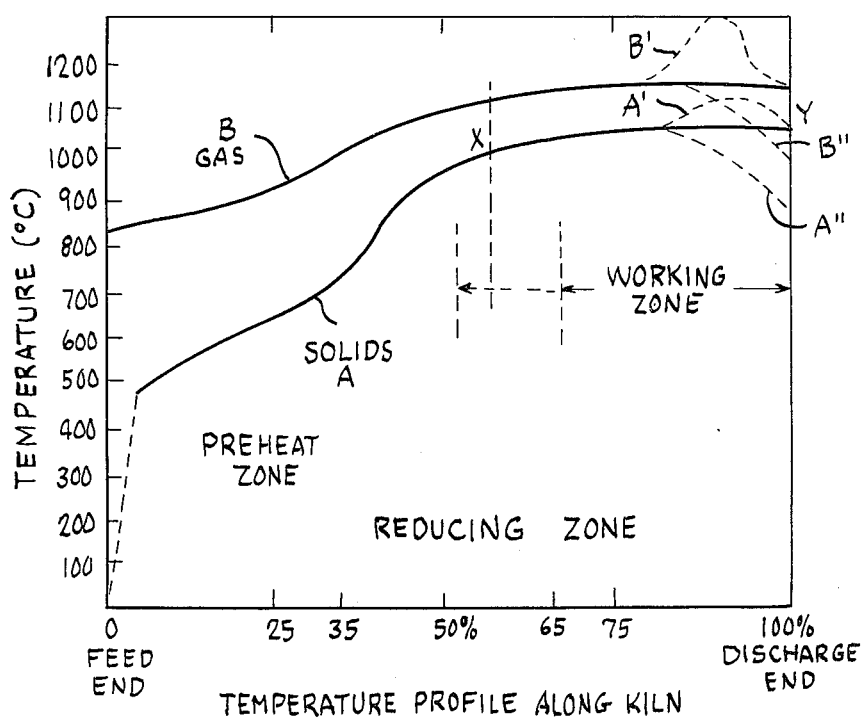

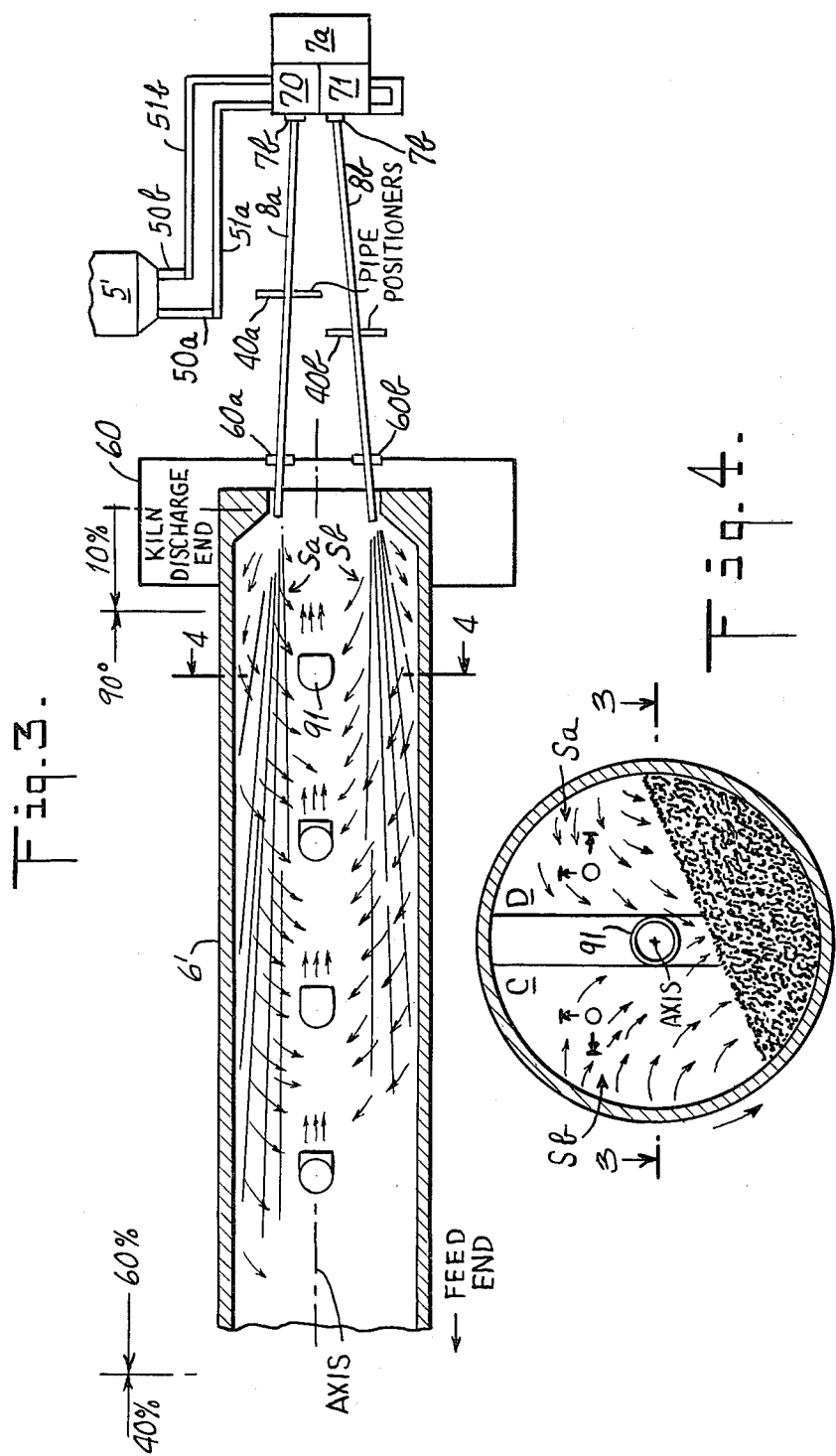

SYSTEM FOR COAL INJECTION IN IRON OXIDE REDUCING KILNS

BACKGROUND OF THE INVENTION

The present invention relates to a process for producing directly reduced iron (DRI) or other mineral products by directly reducing materials containing iron oxides and/or other metal oxides in a rotary kiln using a solid carbonaceous reducing agent, such as coal, and, more particularly, to a method and means for injecting reducing agent into the discharge end of the kiln in an improved manner.

Many different methods have been suggested and used for carrying out the direct reduction of ores and other materials containing iron oxides and/or other metal oxides using solid carbonaceous materials, particularly coal, in a rotary kiln to produce directly reduced iron (DRI) and other mineral products. For example, in some of these processes the coal is fed into the kiln through the discharge end by mechanical or pneumatic means, such as respectively disclosed in U.S. Pat. No. 3,113,859 to Moklebust and U.S. Pat. Nos. 3,505,060 and 3,663,201 to Heitmann, and in some it is fed at the center of or along the kiln, such as disclosed in U.S. Pat. No. 3,206,299 to Senior et al. However, considerable problems have been encountered with these various approaches, many of which problems have been overcome by the process disclosed in U.S. Pat. No. 3,890,138 to Hockin. In this latter process a portion of the coal is injected or blown into the discharge end of the kiln, and the remaining portion of the coal is fed with the other charge materials at the charge feed end. The kiln is generally divided into a reducing zone toward the discharge end and a preheat zone toward the feed end, and the coal is distributed in the kiln in such a manner that the amount of coal injected from the discharge end is sufficient to aid in controlling the charge and gas temperature profiles throughout both zones of the kiln.

Although the process of Hockin was developed particularly for use in reducing ilmenite using high volatile coal, it has been found that the technique of feeding from both ends improves upon the other solid reducing agent feeding methods used in reducing iron-oxide-containing materials in rotary kilns to produce directly reduced iron (DRI) or when producing other mineral products with the direct reduction process. In co-pending U.S. application Ser. No. 266,602, assigned to the same assignee as the present application, the essential parameters appropriate for effective feeding through the discharge end are disclosed and the present invention improves upon the invention disclosed therein, particularly when the techniques are applied in a comparatively large kiln.

SUMMARY OF THE INVENTION

The present invention involves a method and means for controlling bed and gas phase temperatures in a rotary kiln for directly reducing materials containing iron oxides, and/or other metal oxides, using oxygen-containing gas, introduced along the kiln length, and a solid carbonaceous reducing agent or agents as the source of both fuel and reductant, introduced from the charge feed and discharge ends of the kiln, and particularly provides for improved injecting of reducing agent at the discharge end in larger kilns.

More specifically, the discharge-end reducing agent, typically in the form of particles of coal, and/or recycled charred coal or char, and/or other carbonaceous materials, such as wood chips and similar biofuels, is injected, preferably by being blown by low pressure air about 5 to 15 psi, in the form of two or more streams from the ends of two or more respective pipes disposed at the discharge end of the kiln. The longitudinal distribution of the reducing agent or coal deposited by the streams may be extended as far as or even beyond 75% of the charge bed along the kiln length from the discharge end, as needed, even in relatively long kilns, and may be incorporated in the bed over the entire gas/bed interface toward the discharge end by bouncing the streams from the different pipes off the kiln interior walls, preferably in the area between the 40% and 90% kiln length points from the feed end, and directing the streams into one or both of the two upper quadrants of the kiln when bouncing off the kiln walls. Appropriate adjustments may be made in the pipe diameters, the size distribution of the reducing agent particles in the streams from each of the pipes, in the injecting means propelling the streams, in the quadrants of the kiln barrel into which the streams are directed, and in the contact region of the streams with the kiln walls until the process conditions are optimized. With proper regulation of the injected streams of carbonaceous reducing agent in the manner described, and using particles of appropriate sizing, close control of overall kiln performance with considerably improved temperature and heat transfer control, and accordingly improved efficiency of process operation, can be achieved in rotary kilns of any practical length.

BRIEF DESCRIPTION OF THE DRAWINGS

FIG. 2 is a plot of the temperature profiles in the gas and solids bed occurring along the length of the rotary kiln in keeping with the present invention.

FIG. 3 is a diagrammatic plan view of the rotary kiln and the apparatus for injecting the solid carbonaceous reducing agent or coal at the discharge end illustrating the blowing technique of the present invention.

FIG. 4 is a sectional view taken along the lines 4—4 in FIG. 3.

DETAILED DESCRIPTION OF THE PREFERRED EMBODIMENT

Figure 1:
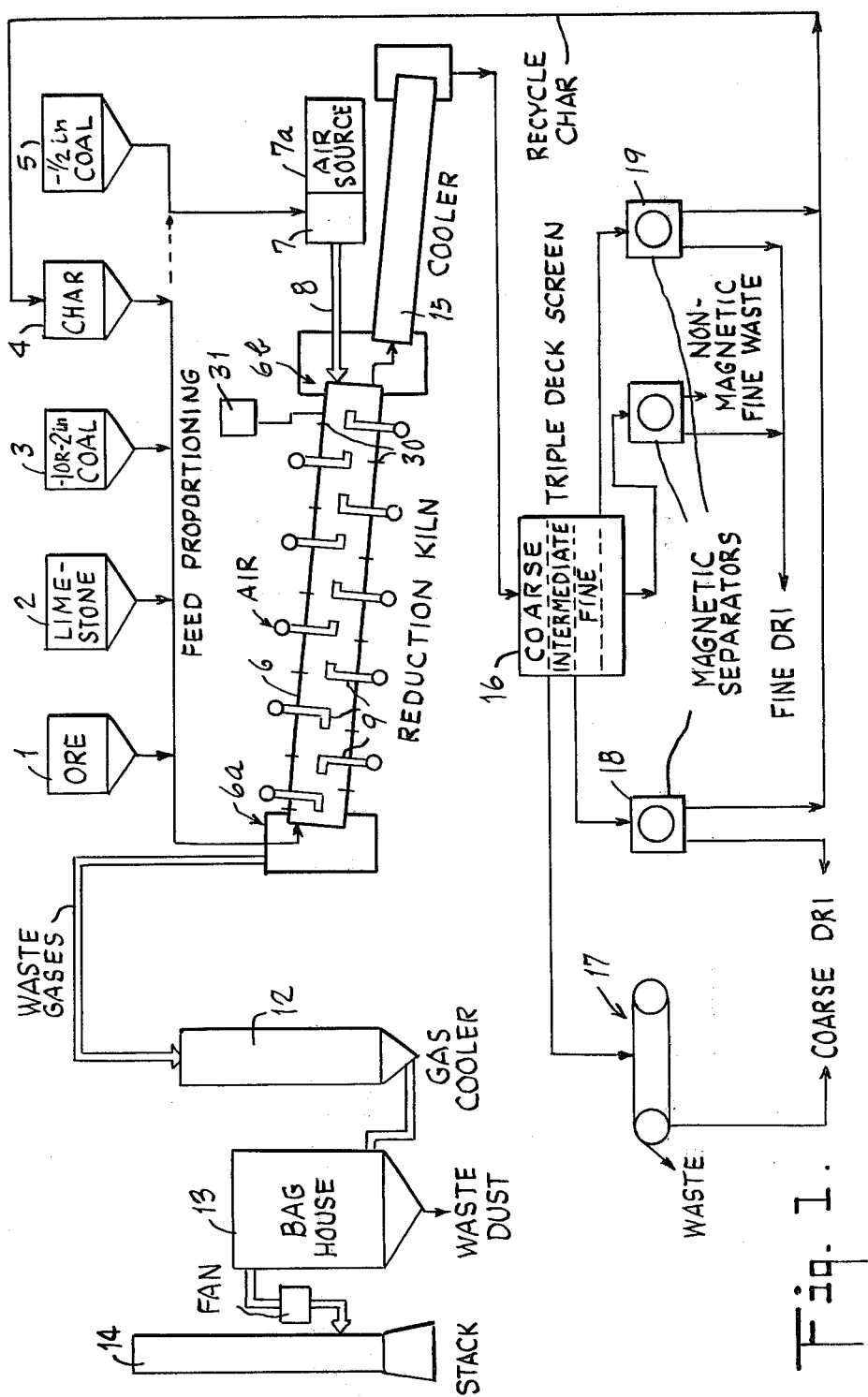
FIG. 1 is a diagrammatic view of a direct reduction plant illustrating the steps and the appropriate equipment including a rotary kiln for carrying out a process for the production of sponge iron or DRI, in which plant and process the present invention may be applied.

A flow diagram of a direct reduction plant for the production of DRI or other mineral products from materials containing iron oxides and/or other metal oxides, of the type utilizing a rotary kiln into which a solid carbonaceous material acting as the source of both fuel and reductant is fed at both the charge feed end and the discharge end, and in connection with which the present invention may be practiced, is shown in FIG. 1. The plant comprises an array of feed bins for holding the process materials, for example, respectively including: a bin 1 for supplying iron-oxide-containing materials, such as ore, typically in the form of iron-oxide pellets or natural lump ore; a bin 2 for providing a desulfurizing agent such as limestone or dolomite for sulfur control; a bin 3 for providing a suitable carbonaceous reducing agent, typically in the form of coal of less than 1 or 2 inch nominal diameter particles; and a bin 4 for supplying return or recycle char. The iron ore, coal, recycle char, and dolomite or limestone are accurately proportioned and may be fed by conventional weigh feeders continuously as a charge to the feed end 6a of a rotary reduction kiln 6 lined with suitable refractory.

A remaining bin 5 supplies additional reducing agent, such as coal, typically of less than ½ inch nominal diameter particles, to the discharge end 6b of the rotary kiln 6, where carefully controlled quantities are injected or blown in. Char particles from bin 4 may also be included with the coal particles injected into the discharge end in the manner described in U.S. Pat. No. 4,337,084 assigned to the same assignee as the present application. To accomplish injection, the particulate discharge-end reducing agent is fed to a feed control device 7 from which it is blown by means of low pressure carrier air from a suitable source 7a, preferably a positive displacement blower, through suitable injection equipment 8. An appropriate method and system for controlling the blowing is disclosed in co-pending U.S. application Ser. No. 266,602 and U.S. Pat. No. 4,306,643, both assigned to the same assignee as the present application.

In addition to the introduction of carrier air through injection equipment 8, the kiln is equipped with a series of shell-mounted air injection tubes 9, typically ten in number but less or more as appropriate, which are spaced along its length and extend into the interior of the kiln for drawing air from the outside and injecting it along the kiln axis to enhance combustion. Each of the tubes 9 is equipped with its own individually controllable fan and motor combination 10 so that the rate of air injection may be independently and properly regulated at spaced positions along the kiln. Certain of the tubes 9 near the feed end 6a of the kiln may be reversed in their direction of injecting the air as explained in U.S. Pat. No. 4,273,314, assigned to the same assignee as the present application.

Also, spaced along the kiln is a series of thermocouples 30, typically twelve or more in number, which measure the average temperature of the charge in the kiln and of the gas. A selective immediate temperature sensing system 31 may also be utilized, such as that disclosed in co-pending U.S. application Ser. No. 250,006, assigned to the same assignee as the present application.

The hot waste gas or off-gases exhaust from the feed end 6a of the kiln and pass into an off- gas processing or cleaning system. In a suitable cleaning system the gases may be passed after optional afterburning to a spray cooling tower 12 where they may be cooled to 260° C. before passing to a bag house 13 equipped with glass fiber bags for removing the fine dust. The cleaned gases may exit via an induced draft fan and a high stack 14.

The material discharged from the discharge end 6b of reduction kiln 6 is received in a sealed transfer chute and consists of a mixture of DRI or other mineral products, coal char, coal ash and desulfurizing agent and other fine waste. This material is cooled in a rotary cooler 15 sealed from the ambient atmosphere, the cooler 15 being fitted with lifters and cooled externally with water. The cooled mixture is then passed from the cooler 15 to a screening system 16, wherein the coarse, intermediate, and fine fractions are screened. The two oversized fractions are subject to magnetic separation in respective magnetic separators 17 and 18, and the remaining fines are magnetically separated in separators 19 and 20. Separators 17 and 18 remove the coarse DRI to the product load out area. The non-magnetic fractions from the separators 17, 18 and 19 are conveyed to the return char bin 4. This separation system then yields coarse and fine DRI, coarse and fine recycle char and fine nonmagnetic waste.

In a plant such as shown and described in connection with FIG. 1, with proper control of combustion conditions over the kiln bed and reduction conditions in the bed, optimum utilization of kiln volume with metallization consistently over 90% can be achieved.

Proper control of the process requires regulation of the overall reduction kinetics which are affected by bed temperature, solids particle size, carbon/iron oxide ratio in the bed, reactivity of the char produced from the coal, the effect of catalysts on char reactivity, and the reducibility of the iron oxide. Control of the rate of heat transfer to the bed and control of bed temperature are critical in achieving steady operation of the kiln so that stable process chemistry and kinetics will result. FIG. 2 shows desirable operating profiles of the solids temperature, Curve A, and gas temperature, Curve B, occurring within a reduction kiln of the present type along its length when reducing natural lump ores or conventional iron oxide pellets.

The kiln is generally regarded as having a preheat zone at the feed end which normally extends through about the first one-third of the kiln length and a reducing zone which extends for the remainder of the kiln length. The relative lengths of these two zones will vary depending upon where a significant part of the reduction actually begins, which in turn will depend upon the bed components and kiln conditions. As seen in FIG. 2 from the solids temperature profile, Curve A, the solids temperature should normally be increased steadily from the feed end through the preheat zone of the kiln and should then increase at a greater rate beyond the preheat zone to a point X which will lie somewhere in the region from about 50% to 67% along the kiln length from the feed end for lump ores and conventional iron oxide pellets. The appropriate position of point X will, as noted, depend upon the materials being processed and may fall outside of this region for other materials.

The solids temperature profile from point X to the discharge end of the kiln, point Y, should be maintained relatively constant irrespective, for the most part, of the materials being reduced. The region from X to Y can be termed the "working zone" of the kiln where optimum operating temperature levels are sought such that reduction of the iron oxides or other metal oxides proceeds to completion at the highest rate possible at the temperature of the solid materials in the bed. The maximum operating temperature of the bed in this working zone is limited by such factors as the onset of sintering of the charge material, accretion formation on the kiln walls and/or other deleterious effects on overall performance and product quality such as, for example, the sulfur content of the DRI product which can be a more important factor than sintering in certain cases as more fully explained in co-pending U.S. application Ser. No. 203,275, assigned to the same assignee as the present application. The permissible maximum temperature for a particular solids bed in the working zone depends on the properties of the specific coal or solid carbonaceous reducing agent that is used in the process because the temperature at which sintering occurs will vary with different coal ashes when mixed with the other solid phases in the bed of solids. Similarly, the temperature level must be monitored to avoid exceeding a level which will cause deleterious sulfur effects. As indicated in FIG. 2 a maximum temperature of up to about 1080° C. for the solids in the working zone and a solids temperature essentially below 750° C. in the preheat zone are typical operating temperatures which are not exceeded in most cases when reducing lump ore and conventional oxide pellets to produce DRI, but these temperature levels may be varied when reducing other iron and/or metal oxides.

It will be appreciated that even, controlled release of heat along the kiln is required to avoid localized high temperatures or "hot spots" in the bed which may cause deleterious effects so that smooth control of the bed and gas temperature profiles is essential to proper process performance particularly over the working zone of the kiln. It has been found that a key factor, if not the most important factor, in optimizing temperature control and heat transfer to the bed is the careful regulation of the feeding of the reducing agent at the discharge end of the kiln to achieve optimum distribution of the reducing agent over the kiln bed.

Firstly, of importance in this regard is the combustion of the volatiles from the reducing agent or coal fed from the kiln discharge end, as this combustion supplements the heat generated by the combustion of carbon monoxide escaping from the bed. The discharge end coal lands in the bed, devolatilizes, and the volatiles generated, or a proportion thereof, together with CO escaping from the bed react with the air from the air tubes 9 in close proximity to the gas/bed interface. This oxidation reaction produces a hot gas region near the gas/bed interface which enhances the most efficient heat transfer mechanism, that is, the radiative heat transfer to the charge bed. Further, the reducing agent upon entering the kiln through the discharge end quickly forms significant numbers of incandescent solid particles, a phenomenon which also improves the rate of radiative heat transfer to the bed. Consequently, with improved discharge end coal injection, a larger proportion of the heat needed to fulfill the heat demand of the bed may be transferred to the bed at normal kiln operating temperatures by virtue of the greater heat transfer rates resulting from the enhancement of gas and incandescent particle radiation.

In particular, to achieve optimum process performance in injecting the reducing agent or coal it has been found that, in addition to the use of a reducing agent with a particle size distribution of ½ inch and less to create the particulate flow, four important factors in connection with feeding and controlling the flow are: (1) the longitudinal distribution of the particles along the bed; (2) the axial spread of the flow; (3) the contact region of the flow with the interior surface of the kiln refractory; and (4) the quadrant of the kiln barrel into which the flow is directed.

In evaluating the particle flow in these four regards for a specific process it must be kept in mind that the temperature profile, that is, the particular temperature levels along the charge bed, for optimum operation of the process will, as already indicated, depend upon the constituents of the solids in the bed and accordingly on the properties of the solid carbonaceous materials, or coal, used as the reducing agent. Hence, the appropriate parameters for each of these four factors in discharge-end coal feeding for any process will vary with the reducing agent or agents used, and the proper combination of these parameters for a given process will generally be determined empirically but within certain limits or guidelines as hereinafter explained.

In previously cited co-pending U.S. application, Ser. No. 266,602 and U.S. Pat. No. 4,306,643 an improved method and means for accomplishing appropriate injection of the reducing agent at the discharge end of a kiln are disclosed. The former application describes a system suitable for use particularly in connection with a reduction kiln having a shell diameter of 11.5 feet (3.5 meters) and a length of 148 feet (45 meters). As described in these applications, the reducing agent or coal is blown into the kiln through a coal injection pipe which is adjusted to achieve the desired trajectory for the agent being used by a means disclosed in the latter application. While the described method and means can be used to considerable advantage in systems of the approximate size of that disclosed in the former application, control problems may arise with regard to the adequacy of the weight distribution of the blown coal, and the deposition distance along the bed, that can be achieved with the described arrangement in cases of scale up to larger kilns wherein the length and diameter of the kilns are significantly increased in order to increase the capacity of the DRI output of the system.

In particular, it will be appreciated that within a longer kiln to achieve a longer trajectory for the blown coal, the volume or mass of air passing through the injection pipe per unit of time and of cross-sectional area must be increased. Of course, a substantial increase in the amount of air blown into the kiln from the discharge end can adversely effect the control of the process conditions within the kiln by interfering with the closely regulatable supply of air being injected through the series of air tubes along the kiln. Also, while the increased capacity of the kiln may or may not require greater discharge end reducing agent input, normally, the size distribution of the reducing agent or coal particles will require more precise control. Further, as an optimum air to solids ratio is important in efficiently achieving the necessary transport of the particles through the pipe, an increase in air volume exiting from the pipe will require an attendant increase in the weight of the coal being blown from the pipe per unit of time so that proper regulation of the size distribution of the coal particles can become quite critical.

The present invention is directed to overcoming the problem of achieving adequate coal injection in longer and wider reducing kilns by providing a combination of two or more coal injection pipes at the discharge end of the kiln, and adjusting the pertinent parameters of the injecting operation to achieve close process control.

By dividing the discharge end coal feeding between two, or among a multiplicity of, injection pipes, and particularly coal blowing pipes, as will be explained, the volume or mass of air required to properly inject the coal into the forward part of the kiln can be considerably reduced thus avoiding interference with process control using regulation of the air volume through the various air tube injectors, and any need for close control of the size distribution of the coal is obviated since the efficient balancing of the air to solids ratio in the individual pipes is more easily obtained without rigid control of particle size distribution. Additionally, selective deposition of the coal particles in particular regions of the kiln bed is more easily achieved.

A preferred embodiment of a system in accordance with the present invention is shown in FIG. 3 wherein it will be seen that the reducing agent is blown as two streams Sa and Sb into the discharge end 6b of the rotating kiln 6' through the pipes 8a and 8b, the end portions of which are supported in adjustable collars 60a and 60b mounted in stationary kiln discharge head 60. While kiln 6' is of a comparatively large capacity, pipe 8a may be the same as the pipe typically used in smaller kilns and may blow coal for deposition all along the bed as far as the pre-heat zone, that is, over about the last 65% or so of the kiln length. However, due to the increased lengths of kilns with larger capacities, if the pipe diameter is comparable to that used in a shorter kiln, the amount of coal which can be selectively distributed over the surface of the bed throughout the extended length per unit time will be limited by the magnitude of the volume of air necessary for projecting the coal from the pipe and the deleterious effect it may have on proper process operation. As the largest proportion of the total heat demand occurs in the working zone of the bed, the need for blown coal is greatest in this zone. In attempting to accomplish the longer trajectory with pipe 8a, an inadequate amount of coal may be deposited in the working zone. In such event the second pipe 8b may be used to supplement the deposition in this region and since the coal supplied by this latter pipe is not required to travel as far into the kiln, the exit velocity of the stream from pipe 8b may be comparatively reduced and accordingly the air volume flow through this pipe need not be of a comparable magnitude to that of pipe 8a.

By way of example as to the manner in which appropriate coal pipe sizes and blowing air volumes may be readily determined for different capacity kilns and processes reference may be made to the following Table I:

4. The orientation of the output ends of the two pipes are indicated generally by the Os in the Figure and each may be individually oriented by adjustment with the respective pipe positioners 40a and 40b to effect the desired stream trajectory from each.

In addition to the pipe orientation, and its diameter, the stream trajectory and deposition may be adjusted and regulated by varying and establishing the other important parameters that effect its travel and distribution, which are the flow volume of the blowing air, and the particulate size of the reducing agent. In particular, the reducing agent used should be of particles which preferably vary in size from ½ inch (12½ millimeters) down to about zero. The reducing agent stream blown from each pipe constitutes a mixture of both coarse and finer fractions and each stream may be blended to produce the desired deposition over the surface of the kiln bed along its length. However, since it is normally more cost effective in terms of capital investment and operating expenditure to supply coal of the same size distribution to all of the injection pipes, the diameters of the various pipes may be selected along with the respective air flow volumes to achieve the desired deposition using a single coal sizing.

The greater the flow volume of the blowing air, the farther the coarser particles will be carried into the kiln so that the longer trajectory pipe 8a will be provided with a greater flow volume and preferably is of a smaller diameter to increase the exit velocity. The shorter trajectory pipe 8b may correspondingly be of a greater diameter as a lower exit velocity is desired and a greater volume of coal may be passed for selective deposition in the working zone of the bed.

In this regard it is important to understand that the

TABLE I

| Kiln Length (feet) | Inside Refractory Diameter (feet) | L/D Ratio # | Particle Time Of Fall From Pipe To Bed (seconds) | Max. Distance Coal To Be Blown (feet) | Pipe Exit Velocity Required (feet/sec) | Blown Coal Rate (lbs/min) | Air To Solids Ratio (ft³:lb) | Volume of Air Required (ft³/min) | Coal Pipe Diameter Range: Single Pipe System (in) |
|---|---|---|---|---|---|---|---|---|---|
| 150 | 11.53 | 13.0 | 0.56 | 113 | 202 | 30.0 | 18 | 540 | 1.5 to 2.0 |
| 165 | 11.41 | 14.46 | 0.57 | 124 | 218 | 33.3 | 18 | 600 | 1.5 to 2.0 |
| 197 | 13.45 | 14.65 | 0.62 | 148 | 239 | 53.3 | 17 | 906 | 2.0 to 2.5 |
| 230 | 15.90 | 14.47 | 0.67 | 173 | 258 | 73.3 | 16 | 1173 | 2.0 to 2.5 |
| 263 | 18.10 | 14.53 | 0.71 | 197 | 277 | 93.3 | 15 | 1400 | 2.25 to 3.0 |
| 286 | 16.3 | 17.55 | 0.68 | 215 | 316 | 110.0 | 17 | 1870 | 2.0 to 2.5 |

It will be seen from the table that L/D ratios, that is, the ratios of the kiln length (L) to internal refractory diameter (D), for kilns of the present type are typically in the range of about 12:1 to 18:1 and the air to solids ratio through the injection pipe is preferably in the range between about 15:1 and 18:1. Conveniently pipe 8a may be 2 inches in diameter and the diameter of pipe 8b may be somewhat larger depending upon the kiln length and the rate of blown coal necessary.

Since in the case of larger capacity kilns, the internal refractory diameter of the kiln must be increased somewhat proportionately with the increase in length to maintain a suitable L/D ratio, adequate room will be afforded for the disposition of two or more coal blowing pipes within the discharge end of the kiln, without resulting in undue interference between or among them. Two or more pipes may be directed into the same upper quadrant of the kiln barrel while bouncing the coal off different regions along the length of the kiln side wall, but preferably when two pipes are used, such as 8a and 8b, they are respectively directed into the two upper quadrants C and D of the kiln barrel as shown in FIG.

distribution of the coal over the bed for optimum process control should be adjusted to satisfy the endothermic heat demands of the charge bed along the various or successive segments of the kiln length. Specifically, the maximum percentage weight distribution of the blown coal should fall into the segmental portions of the bed requiring the greatest quantities of heat so that while the longitudinal deposition of the coal may be required to extend over as much as or even beyond 75% of the kiln length, the major portion of the coal will be incorporated in the bed over the entire working zone. The preferred steps for producing the required coal feeding will now be described.

To begin with, kiln design capacity is taken into consideration and the amount of reducing agent or coal needed to be fed from the discharge end is determined, which will typically be in the range from about 15% to 35% of the total amount fed to the kiln depending principally upon kiln shell heat losses and the volatiles content of the coal. Based on the constituents to be used in the process the distance along the kiln bed over which coal deposition will be needed is evaluated. Using these factors in the manner indicated in Table I appropriate pipe diameter sizes may be selected. The reducing agent sizing may then be considered for each pipe, keeping in mind that the general deposition pattern of the stream is governed by the fact that the coarser particles tend to travel farther along the kiln bed than the finer particles. Advantageously, due to the versatility of feeding afforded by the use of two or more injection pipes, the coal sizing will not normally be critical so that, as mentioned, for cost effectiveness, provision can be made for using the same particle size distribution in all of the pipes; this sizing, being of $\frac{1}{8}$ inch and less particles. Once these essential component parameters, namely the pipe diameters and the sizing of the reducing agent, have been decided upon, the system is ready for operation and empirical fine adjustment to establish efficient process performance.

In actual operation, firstly, the pipe orientations are set to direct the reducing agent or coal streams generally over the bed and against the interior surface of the kiln refractory, that is, the kiln interior side walls, to cause deposition of the coal all along the bed. The orientation of the pipes 8a and 8b as shown in FIG. 3, may be individually adjusted by applying bending forces to them by means of their respective positioning devices 40a and 40b (which, as noted, are preferably of the type disclosed in U.S. Pat. No. 4,306,643) and by using as braces suitable collars 60a and 60b, in the access port of the kiln discharge head 60, and suitable bolt joints 7b at the pipe feed end connections to the blowing equipment. Pipe 8a may initially be oriented such that the axis of its end portion is directed into upper quadrant D of the kiln barrel (see FIG. 4) and pipe 8b may be directed into upper quadrant C, each at respective vertical and azimuthal angles in relation to the kiln axis estimated to produce the desired stream trajectories. The vertical orientation of each pipe will principally effect the distance of travel of its stream, and the azimuthal orientations will effect the spread of particles over the surface of the kiln bed by virtue of the locations at which the streams bounce off the kiln side walls.

With pipes 8a and 8b initially oriented, coal blowing may then begin using the blowing equipment to establish the coal streams. The longitudinal distribution of the coal can then be regulated by selectively varying the individual air flow volumes through each of the pipes which in turn varies the air and particle exit velocity and tends to separate the deposition regions of the coarser and finer coal particles on the bed surface by virtue of the differences in the distance of travel of the particles along the bed. The air flow is preferably produced by an air source 8a in the form of one or more positive displacement blowers, rather than by compressors, so that the flow will be suitably high in exactly measured volume while low in pressure, of the order of 5 to 15 psi, such as may be within the capability of a conventional medium-priced positive displacement blower. Each pipe is connected to a separate fireman device 70, 71; suitable devices for this purpose being those manufactured by Maschinenfabrik Karl Brieden and Co. of Bochum-Linden, West Germany. It is particularly desirable that separate supply systems be run from the storage bin or bins 5' to each of the fireman devices so that, as seen in FIG. 3, each system may comprise extraction devices 50a and 50b and weigh feeding devices 51a, 51b which are connected respectively to fireman devices 70 and 71.

The longitudinal distribution having thus generally been established, the desired deposition pattern of the coal over the gas/bed interface may then be established by appropriate bouncing of the coal streams off the kiln refractory surface or wall. It has been found that the wall area or zone between about the 40% and 90% kiln length points from the feed end, or conversely about 10% to 60% of the distance from the discharge end, is the appropriate contact region to be used and the pipe ends may be reoriented to vary the stream directions and establish the optimum distribution. It is important in reorienting the injection pipes in this regard that the quadrants of the kiln barrel into which the coal streams are blown be taken into consideration and FIG. 4 illustrates the upper quadrants C and D within the kiln barrel into which the coal should be directed in achieving suitable distribution. Either of the upper two quadrants C or D may be used for one or more or all of the streams in accordance with what may be found to be most suitable for a given process. Quadrant D may be preferred for the longer trajectory stream Sa, in which event, as previously mentioned and shown in FIG. 3, the stream Sb from the second pipe 8b may be directed into quadrant C to deposit the blown coal particles on the bed surface primarily over the working zone. Thus, pipe 8b can be used in a sense for supplementary coal feeding, that is, to fill in for the feeding produced by the longer trajectory pipe 8a in the regions of the charge bed where additional reducing agent is required by the greater heat demand. The longer trajectory pipe 8a may then deposit reducing agent at least over 50% of the length of the charge bed from the discharge end and beyond, while the shorter trajectory pipe 8b may deposit its stream particles primarily over about the last one-third to one-half of the charge bed where they are most needed.

After the streams have initially been established, the orientation of pipes 8a and 8b may be adjusted or varied to achieve an optimum distance of travel for each of the streams and optimum particle distribution over the surface of the kiln bed. Accordingly, the axis of the end portion of pipe 8a, directed into upper quadrant D, may be adjusted vertically through angles in the range from about 1° to 10° upwardly with respect to the kiln axis and azimuthally to the right with respect to the kiln axis through angles in the range from about 1° to $12\frac{1}{2}$°, so that stream Sa can be bounced off the refractory wall at locations lying anywhere in the range from about the 1 o'clock to 4 o'clock positions within the kiln barrel, all as viewed from the discharge end. It should be noted that, while the bed in FIG. 4 is shown as contacting the kiln wall somewhat above the 3 o'clock position, the illustrated section is taken through the discharge end of the kiln where the bed has its greatest depth and that the depth decreases toward the feed end of the kiln. Pipe 8b will preferably be adjustable such that the axis of its end portion may be directed into upper quadrant C at vertical angles in the range from about 1° to 5° upwardly with respect to the kiln axis and azimuthally through angles in the range from about 1° to $12\frac{1}{2}$° to the left with respect to the kiln axis, whereby the stream Sb may be bounced off the kiln wall at locations lying anywhere in the range from about the 11 o'clock to 8 o'clock positions within the kiln barrel, all as viewed from the discharge end.

When combustion and sustained process operation have been achieved, samples and readings are taken to determine the metallization and temperature profiles within the kiln charge bed. Adjustments to the process may be accomplished by variation of the volume of air flow through the respective pipes to vary the coal distribution and deposition patterns on the charge bed. Also, the volume of combustion air or oxygen-containing gas fed along the kiln axis may be varied appropriately through each of the shell-mounted air tubes and the temperature response evaluated from the profile readings. If the temperature response is slow in certain critical segments of the kiln bed where metallization should be high, the volume of air to the discharge end blowing pipes may be varied further until the carbonaceous reducing agent deposition onto the surface of the charge bed is such as to produce optimum process conditions.

When the appropriate parameters for a particular metal oxides-containing material are thus empirically determined, those skilled in the art will understand the direction in which the coal blowing parameters should be adjusted in order to perform the process with other iron and/or metal-oxides in view of the different heat transfer requirements of the latter with respect to the reduction characteristics of the empirically evaluated metal oxide.

It will accordingly be appreciated that optimum operation of the present process, as is commonly the practice in the metallurgical art, will result from initially developing empirically the appropriate parameters for a particular combination of process materials using the procedures just described, and then applying the knowledge gained, by using it as a basis for proceeding to develop further empirical knowledge of what the appropriate parameters may be when other materials are substituted.

With the multiple injection system of the present invention, blown coal addition to larger kilns can be used to satisfy the important process control requirements of the direct reduction process. For example, combustion of the volatiles from the blown coal, when coal of appropriate sizing is used, may supply additional heat to portions of the kiln bed where the combustion of CO escaping from the bed may not alone meet the heat demand. These portions may occur in segments of the charge bed where the heat requirement is especially high, such as where the bulk of oxide reduction is occurring and also in regions where the rate of evolution of CO is limited by either the working temperature or the availability of iron-bound oxygen for CO formation. Even heat release can then be achieved within the kiln by the correct longitudinal distribution of the blown coal along the kiln bed towards the feed end, in combination with the use of metered air input at the respective air tubes 9 spaced along the kiln. This combination permits the bed and gas temperature profiles to be closely controlled and allows the required heat transfer to be achieved, while avoiding high and uncontrollable temperature and heat concentrations which might be induced in the process by the use of other fuels such as oil, gas, or pulverised solid fuel injection. Consequent and massive sintering can occur in regions where such heat concentrations or "hot spots" occur and abnormally hot zones of this type, such as indicated by dotted curves A', B' in FIG. 2, tend to occur when such other supplementary fuels are used.

A further important control feature of the present invention which should be mentioned involves control of the kiln exhaust gas temperatures. Kiln exhaust gas temperatures are governed primarily by the volatiles content of the coal or reducing agent being used and the in-kiln preheating zone combustion air addition. This typical temperature range of the exhaust gases may be from about 500° C. for a low volatile coal to about 900° C. for a high volatile coal. Injection of a proportion of the coal from the discharge end in accordance with the described techniques of the present invention may actively depress the exhaust gas temperature by up to 200° C. This temperature depression phenomenon can be demonstrated during normal operation of the kiln by simply stopping the discharge end coal supply. It has been found in smaller kilns under such circumstances that there is an immediate and sharp rise in the exhaust gas temperature which may be immediately reversed upon reestablishing the discharge end coal supply. These results indicate that improved heat transfer and combustion efficiency can be achieved with the described coal feeding technique in larger kilns, since a comparable reduction of the exhaust gas temperature should result and produce a reduction in the heat waste to exhaust.

Also with the ceasing of blown coal feeding at the discharge end, the bed and gas temperatures at the end, and thus in the working zone, have been found to drop, as illustrated by the dashed curves A'', B'' in FIG. 2.

The larger kilns in which the use of the multiple blowing technique of the present invention is contemplated would be of a length in the range indicated in Table I with L/D ratios of up to about 18:1. Such kilns have been calculated to be capable of an estimated production capacity in the range from about 100,000 up to about 200,000 tons per year of DRI when reducing iron oxides.

Of course, in such larger kilns the number of the air tubes 9 and the average temperature sensing thermocouples 30 spaced along the kiln length may be increased to suit specific raw material and production requirements. The selective immediate temperature sensing system 31 such as disclosed in co-pending U.S. Application Ser. No. 250,006 can be used without change or modified as appropriate.

It is particularly desirable, as noted, that the blown coal feeding system be adapted to the use of multiple injection pipes by providing separate supply systems from the storage bin 5', so that each supply system would comprise an extraction device, a weigh feeding device, a fireman, and an injection pipe and adjustment device. Individual air sources may also be used with each supply system and other pressures as appropriate.

It will accordingly be seen that in accordance with the present invention proper coal blowing can be accomplished in larger kilns to achieve improved heat transfer to the charge bed in the particular portions having the greatest demand for heat. In addition the blown coal may prevent depletion of char from certain charge bed regions wherein depletion may occur due to segregation or upset conditions caused by prolonged kiln stoppages. Consequently, by carefully regulating the air pressure injection rates and directions of blowing from the various pipes, as well as the proportion and nature of the discharge end reducing agent blown, close control of overall kiln performance can be achieved with considerable attendant increase in process efficiency.

Although coal blowing is preferred and has been described as the means of injection, various other suitable devices, used alone or in combination with the blowing, are also contemplated for this purpose as will be within the purview of those skilled in the relevant art.

What is claimed is:

1. Method for feeding a supply of solid carbonaceous reducing agent through the discharge end of a large rotary kiln directly reducing materials containing metal oxides wherein a major portion of the supply of the solid carbonaceous reducing agent is fed through the charge feed end and the remaining portion is fed through the discharge end, comprising the steps of:

forming said remaining portion of the solid carbonaceous reducing agent to be fed through the discharge end into a mixture of sized particles;

producing first and second streams of reducing agent particles from said mixture and directing said streams through the discharge end into at least one of the upper quadrants and against the kiln wall for depositing said particles over the surface of the charge bed in the kiln; and adjusting the flow of each stream such that the first stream deposits particles on the surface of the charge bed over at least 50% of the kiln length from the discharge end and the second stream deposits particles primarily on the bed surface over regions requiring the greatest heat transfer rates.

2. Method as in claim 1 wherein said streams are produced by blowing the particles with low pressure air through respective injection pipes, the pipe producing said first stream having a smaller diameter than the pipe producing said second stream.

3. Method as in claim 2 wherein the pipes are oriented such that said streams bounce off opposite sides of the interior surface of the kiln in regions between about 10% and 60% of the kiln length from the discharge end.

4. Method as in claim 3 wherein said first stream is bounced off the kiln interior surface at a location between about the 1 o'clock and 4 o'clock positions within the kiln barrel viewed from the discharge end.

5. Method as in claim 3 wherein said second stream is bounced off the kiln interior surface at a location between about the 8 o'clock and 11 o'clock positions within the kiln barrel viewed from the discharge end.

6. A method of supplying reductant to the charge bed in a rotary kiln directly reducing materials containing metal oxides using a supply of solid carbonaceous reducing agent, a portion of which is fed through the charge feed end and the remaining portion of which is fed through the discharge end of the kiln and which bed has a preheat zone over about one-third of the kiln length from the charge feed end and a working zone over at least one-third of the kiln length from the discharge end, comprising the steps of:

creating at least two streams of sized reducing agent particles from said remaining portion comprising in total between about 15% to 35% by weight of the solid carbonaceous reducing agent fed to the kiln and directing said streams through the discharge end of the kiln;

directing one stream to deposit the particles all along the surface of the charge bed at least as far as the preheat zone; and directing another stream to primarily deposit the particles on the bed surface in the working zone.

7. Method of claim 6 wherein said one stream is created by producing a high volume flow of low pressure air through a pipe of a selected diameter and said another stream is created by producing a lesser volume flow of low pressure air, through a larger diameter pipe, into which pipes said particles are fed.

8. Method as in claim 6 wherein said one and said another streams are created by producing high volume flows of low pressure air through two pipes of the same diameter, into which pipes said particles are fed, and the trajectories of said streams are varied by producing different volume flows of air.

9. Method as in claim 7 or 8 wherein said streams are bounced off the interior wall of the kiln in the region between about 10% and 60% of the kiln length from the discharge end.

10. Method as in claim 9 wherein said one stream is bounced off the kiln interior wall at a location between about the 1 o'clock and 4 o'clock positions within the kiln barrel viewed from the discharge end.

11. Method as in claim 9 wherein said another stream is bounced off the kiln interior surface at a location between about the 8 o'clock and 11 o'clock positions within the kiln barrel viewed from the discharge end.

12. A system for controlling heat transfer to the charge bed in a rotary kiln directly reducing materials containing metal oxides using a supply of solid carbonaceous reducing agent, a major portion of which is fed through the charge feed end and the remaining portion of which is fed through the discharge end of the kiln and which bed has a preheat zone extending over about the first one-third of the kiln length from the charge feed end and a working zone extending over at least the last one-third of the kiln length from the discharge end, comprising:

means for creating at least two streams of sized reducing agent particles from said remaining portion;

means for directing the two streams through the discharge end of the kiln to deposit the stream particles over the surface of the charge bed in the kiln, said directing means comprising respective injection pipes disposed at the discharge end of the kiln, one of said pipes being of a smaller diameter than the other of said pipes; and means for adjusting the direction and rates of feeding of the two streams such that the stream from said smaller diameter pipe deposits particles of reducing agent along the surface of the charge bed at least as far as the preheat zone and the other pipe's stream deposits particles principally over the gas/bed interface in the working zone of the kiln.

13. A system as in claim 12 wherein said smaller diameter pipe is oriented at an angle between about 1° and 10° upwardly with respect to the kiln axis and azimuthally at an angle between about 1° and 12½° to the right with respect to the kiln axis as viewed from the discharge end.

14. A system as in claim 12 wherein the larger diameter other pipe is oriented at an angle between about 1° and 5° upwardly with respect to the kiln axis and azimuthally at an angle between about 1° and 12½° to the left with respect to the kiln axis as viewed from the discharge end.

15. A system as in claim 12 wherein said means for creating said streams comprises respective fireman means for receiving the sized reducing agent particles and positive displacement blower means for blowing the particles from said fireman means using low pressure air into respective particle streams.

16. A system as in claim 15 wherein said adjusting means comprises means for varying the air flow volume from said blower means.

* * * * *